J. G. HEY.
BELT TIGHTENER.
APPLICATION FILED FEB. 25, 1909.
945,326.
Patented Jan. 4, 1910.
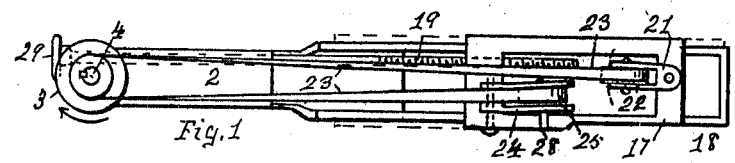
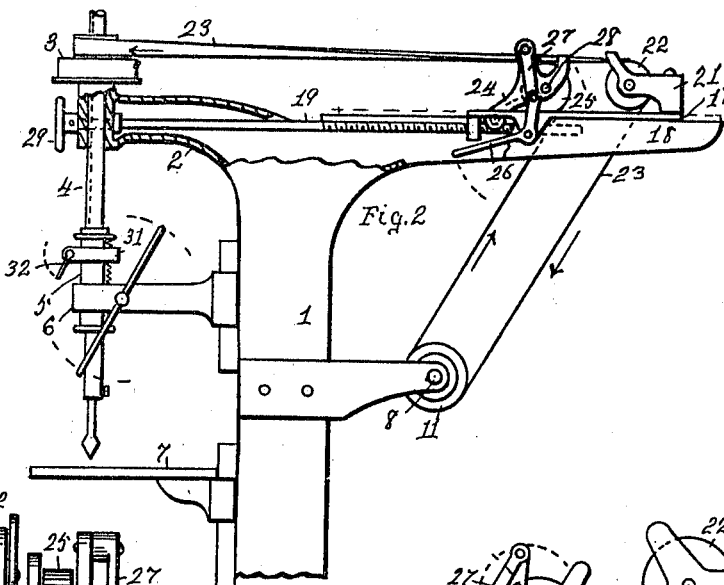
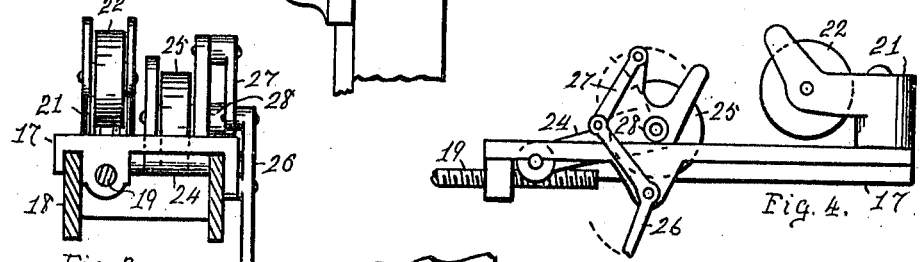
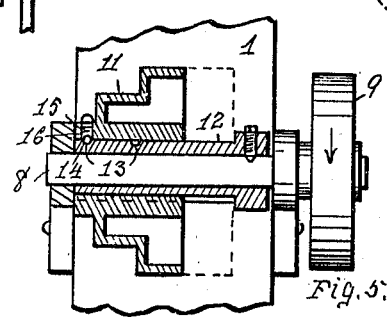
Witnesses.
E. E. Carr.
Samuel S. Carr.
John G. Hey, Inventor,
By Robert S. Carr, Atty.

UNITED STATES PATENT OFFICE.

JOHN G. HEY, OF CINCINNATI, OHIO, ASSIGNOR TO THE CINCINNATI PULLEY MACHINERY COMPANY, OF CINCINNATI, OHIO, A CORPORATION OF OHIO.

BELT-TIGHTENER.

945,326.  Specification of Letters Patent.  Patented Jan. 4, 1910.

Application filed February 25, 1909. Serial No. 479,933.

*To all whom it may concern:*

Be it known that I, JOHN G. HEY, a citizen of the United States, residing at Cincinnati, Ohio, have invented a new and useful Improvement in Belt-Tighteners, of which the following is a specification.

My invention relates to belt tighteners, and the objects of my improvements are to provide movable belt tighteners for adapting a belt to be used on the different steps of a cone pulley; to provide a yielding mechanism for maintaining a pulley in different predetermined longitudinal positions on a shaft; and to provide simple and durable construction and assemblage of parts for securing facility of operation and efficiency of action. These objects are attained in the following described manner as illustrated in the accompanying drawings, in which:—

Figure 1 is a plan of my improved belt tightener as applied to an upright drill press; Fig. 2, a side elevation with parts broken away and parts in section; Fig. 3, and Fig. 4, respective front and side elevations of the sliding carriage; Fig. 5, a longitudinal section of the driving cone pulley.

In the drawings, 1 represents the column of an upright drill press, 2 the top yoke, 3 a driven cone pulley, 4 the spindle splined therein, 5 the spindle sleeve, 6 the sliding head, 7 the adjustable table, 8 the driving shaft and 9 a driven pulley thereon, all being constructed and arranged in the ordinary manner.

The driving cone pulley 11 is splined on a sleeve 12 which is secured on the driving shaft 8 and formed with ball seats 13. A ball 14 may be yieldingly maintained within said seats by means of a coil spring 15 secured within an opening 16 formed in the hub of the pulley 11 for maintaining said pulley in predetermined longitudinal positions on shaft 8, as shown in Fig. 5.

A carriage 17 slidable on the rear extension 18 of the top yoke may be moved and maintained in more or less rearward positions thereon by means of the hand screw 19. A yoke 21 swiveled on the carriage is provided with an idle pulley 22 for automatically directing the travel of the belt 23 from the spindle pulley 3 to the driving cone pulley 11. A yoke 24 hinged near the front of the carriage and movable in a vertical plane is provided with an idle pulley 25 for directing the travel of the belt 23 toward the spindle pulley 3 as shown by the arrows in Fig. 2.

A bell crank lever 26 mounted at a fixed point on the side of the carriage and connected with the yoke 24 by means of a link 27 serves to lock said yoke with the idler 25 in a predetermined vertical position, as shown in Fig. 2, for directing the belt to properly travel on the upper step of the spindle pulley.

When the lever 26 is moved into the position shown in Fig. 4, the idler 25 with the yoke 24 is forced in a downward direction by the belt until the stop 28 contacts with the carriage that said idler may direct the belt to properly travel on the lowest step of the spindle pulley. A change of belt speeds may be obtained by shifting the driving cone longitudinally on the main shaft as shown by dotted lines in Fig. 5 for permitting the belt to travel in proper alinement on a different step thereon. When the belt is shifted from a larger to a smaller step of either the driving or the spindle pulley, the hand screw 19 serves to move and maintain the carriage with the idlers thereon in proper rearward position for maintaining the belt under any amount of tension desired to accommodate its action to the use of drills of different sizes. The convenient location at the front of the top yoke of the actuating hand wheel 29 of the adjusting screw 19 facilitates changing the tension of the belt, and the convenient location of the hand lever 26 at the side of the top yoke facilitates the shifting of the belt for changing the speed of the spindle when desired.

Having fully described my improvements, what I claim as my invention and desire to secure by Letters Patent of the United States is:—

1. In a drill press the combination of a driving pulley rotatable in a vertical plane, a spindle cone pulley rotatable in a horizontal plane, a belt arranged to drive the latter from the former pulley, a swiveled idler for one stretch of the belt, a vertically adjustable idler for the other stretch thereof, and means for simultaneously moving the idlers for changing the tension of the belt.

2. In a drill press the combination of a top yoke formed with a rear extension, a carriage slidable thereon, a hand screw for sliding the carriage, a yoke swiveled on the carriage, an idle pulley thereon, a yoke hinged on the carriage, a similar idle pulley thereon, and lever mechanism for moving and maintaining the hinged yoke with the idle pulley thereon in a predetermined vertical position.

JOHN G. HEY.

Witnesses:
R. S. CARR,
L. B. PATTERSON.